US011889387B2

(12) United States Patent
Suzuki et al.

(10) Patent No.: US 11,889,387 B2
(45) Date of Patent: Jan. 30, 2024

(54) COMMUNICATION APPARATUS, DISTRIBUTION APPARATUS, COMMUNICATION SYSTEM, TRANSMISSION METHOD, AND NON-TRANSITORY COMPUTER READABLE MEDIUM

(71) Applicant: NEC CORPORATION, Tokyo (JP)

(72) Inventors: Naoaki Suzuki, Tokyo (JP); Apostolos Papageorgiou, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/969,769

(22) PCT Filed: Feb. 14, 2019

(86) PCT No.: PCT/JP2019/005440
§ 371 (c)(1),
(2) Date: Aug. 13, 2020

(87) PCT Pub. No.: WO2019/160061
PCT Pub. Date: Aug. 22, 2019

(65) Prior Publication Data
US 2020/0413228 A1 Dec. 31, 2020

(30) Foreign Application Priority Data
Feb. 16, 2018 (JP) .................. 2018-025795

(51) Int. Cl.
*H04W 4/06* (2009.01)
*H04W 4/90* (2018.01)
*H04W 64/00* (2009.01)

(52) U.S. Cl.
CPC .............. *H04W 4/06* (2013.01); *H04W 4/90* (2018.02); *H04W 64/00* (2013.01)

(58) Field of Classification Search
CPC ........... H04W 4/90; H04W 4/06; H04W 4/12; H04W 60/00; H04W 76/50;
(Continued)

(56) References Cited

U.S. PATENT DOCUMENTS 9,693,209 B2 * 6/2017 Tsutsui .................... H04W 4/90
2012/0269118 A1 * 10/2012 Wang .................... H04W 76/40
370/328

(Continued)

FOREIGN PATENT DOCUMENTS

WO 2013/161274 A1 10/2013
WO 2014/024545 A1 2/2014
(Continued)

OTHER PUBLICATIONS

3rd Generation Partnership Project; Technical Specification Group Core Network and Terminals; Technical realization of Cell Broadcast Service (CBS) (Release 15), Dec. 2017, V15.0.0, 72 pages.
(Continued)

*Primary Examiner* — Jean A Gelin
(74) *Attorney, Agent, or Firm* — Sughrue Mion, PLLC

(57) ABSTRACT

A communication apparatus (10) according to the present disclosure includes a position information management unit (11) configured to manage a distribution area used in a mobile communication system and position information indicating a position of a communication terminal connected to an access system different from the mobile communication system while associating the distribution area with the position information, a communication terminal management unit (12) configured to manage the communication terminal and a distribution area to which the communication terminal belongs while associating the communication terminal with the distribution area based on positional information indicating a current position of the communication
(Continued)

terminal, and a communication unit (13) configured to, when it receives distribution data for which the distribution area is designated as its distribution destination, transmit the distribution data, whose distribution destination has been changed to the communication terminal associated with the distribution area, to the communication terminal.

2 Claims, 11 Drawing Sheets

(58) Field of Classification Search
CPC ........... H04W 84/042; H04W 28/0289; H04W 48/02; H04W 48/06; H04W 48/10; H04W 64/00; H04W 88/06; H04W 92/02
See application file for complete search history.

(56) References Cited

U.S. PATENT DOCUMENTS

| | | | |
|---|---|---|---|
| 2013/0065606 A1 | 3/2013 | Kurokawa et al. | |
| 2014/0348067 A1* | 11/2014 | Previti | H04W 4/90 370/328 |
| 2015/0156667 A1* | 6/2015 | Aoyagi | H04W 4/90 455/404.1 |
| 2015/0327152 A1* | 11/2015 | Tsutsui | H04W 68/005 455/404.1 |
| 2015/0350863 A1* | 12/2015 | Tsutsui | H04W 4/90 455/404.1 |
| 2016/0165648 A1* | 6/2016 | Kawashima | H04W 40/22 455/450 |
| 2016/0191180 A1* | 6/2016 | Grzywacz | H04W 4/90 455/3.01 |
| 2017/0142560 A1* | 5/2017 | Ryu | H04W 4/90 |
| 2018/0054722 A1* | 2/2018 | Tamura | H04W 4/90 |
| 2018/0167796 A1* | 6/2018 | Raje | H04W 4/023 |
| 2019/0110182 A1* | 4/2019 | Liu | H04W 60/00 |
| 2019/0313232 A1* | 10/2019 | Lee | H04W 4/90 |
| 2019/0394711 A1* | 12/2019 | Kim | H04W 76/25 |
| 2020/0015117 A1* | 1/2020 | Wu | H04W 28/0268 |
| 2020/0015309 A1* | 1/2020 | Li | H04W 8/02 |
| 2020/0037205 A1* | 1/2020 | Ying | H04W 76/10 |
| 2020/0092710 A1* | 3/2020 | Kim | H04W 8/10 |
| 2020/0178076 A1* | 6/2020 | Ben Henda | H04W 12/06 |
| 2020/0196112 A1* | 6/2020 | Chandramouli | H04W 4/14 |
| 2020/0245284 A1* | 7/2020 | Hans | H04L 12/2818 |
| 2020/0280435 A1* | 9/2020 | Lehtovirta | H04L 9/0822 |
| 2020/0280890 A1* | 9/2020 | Vikberg | H04W 36/0033 |
| 2020/0396587 A1* | 12/2020 | Kim | H04W 8/04 |
| 2021/0058748 A1* | 2/2021 | Liao | H04L 12/189 |
| 2022/0007150 A1* | 1/2022 | Edge | H04W 64/00 |

FOREIGN PATENT DOCUMENTS

| | | |
|---|---|---|
| WO | 2014/027431 A1 | 2/2014 |
| WO | 2016/147600 A1 | 9/2016 |

OTHER PUBLICATIONS

International search report for PCT/JP2019/005440 dated Apr. 9, 2019.
The Extended European Search Report dated Oct. 28, 2020, issued by the European Patent Office in application No. 19754772.2.
Japanese Office Action for JP Application No. 2020-600565 dated Nov. 9, 2021 with English Translation.
Japanese Office Action for JP Application No. 2020-500565 dated Jul. 13, 2021 with English Translation.
Nokia, Nokia Shanghai Bell, "Discussion on Non-3GPP Access support in NGAP", 3GPP TSG RAN WG3 adhoc_R3-AH-1801, R3-180001, Jan. 21, 2018, France.
Nokia, Alcatel-Lucent Shanghai Bell, "Pseudo-CR on supporting PWS in 5GS via SBc like Interface", 3GPP TSG-CT WG1 Meeting #105, C1-173074, Aug. 14, 2017, Poland.

* cited by examiner

| TA | EA | Cell | location |
|---|---|---|---|
| TA-1 | EA-1 | Cell-1 | location-1 |
| | | | location-2 |
| | | Cell-2 | location-3 |
| | | Cell-3 | |
| TA-2 | EA-1 | Cell-4 | location-4 (AP-1) |
| | EA-2 | Cell-5 | |
| | | Cell-6 | |

Fig. 3

| TA | EA | Cell | location | UE |
|---|---|---|---|---|
| TA-1 | EA-1 | Cell-1 | location-1 | UE-1 |
| | | | location-2 | UE-2 |
| | | Cell-2 | location-3 | UE-3 |
| | | Cell-3 | | |
| TA-2 | EA-1 | Cell-4 | location-4 (AP-1) | UE-4 |
| | | | | UE-5 |
| | EA-2 | Cell-5 | | |
| | | Cell-6 | | |

Fig. 4

| TAI list | TA | N3IWF |
|---|---|---|
| TAI list-1 | TA-1<br>TA-2 | N3IWF-1<br>N3IWF-2<br>N3IWF-3 |
| TAI list-2 | TA-3<br>TA-4<br>TA-5<br>TA-6 | N3IWF-3<br>N3IWF-4 |

Fig. 6

COMMUNICATION APPARATUS, DISTRIBUTION APPARATUS, COMMUNICATION SYSTEM, TRANSMISSION METHOD, AND NON-TRANSITORY COMPUTER READABLE MEDIUM

CROSS-REFERENCE TO RELATED APPLICATIONS

This application is a National Stage of International Application No. PCT/JP2019/005440 filed on Feb. 14, 2019, which claims priority under U.S.C. § 119(a) to Japanese Patent Application No. JP2018-025795 filed on Feb. 16, 2018, the entire disclosure of which is incorporated herein.

TECHNICAL FIELD

The present disclosure relates to a communication apparatus, a distribution apparatus, a communication system, a transmission method, and a program.

BACKGROUND ART

3GPP (3rd Generation Partnership Project) defines specifications of LTE (Long Term Evolution) as a communication method used in radio access networks. The 3GPP lays down communication standards for mobile communication systems. Further, the 3GPP defines specifications of an EPC (Evolved Packet Core) as a communication method used in core networks.

Further, in the 3GPP, a so-called 5G (5 Generation) communication system is currently being studied as a next-generation communication system. In the 5G, it has been studied how a communication terminal connects to a 5GC (5G Core Network) through an access network using a communication method whose specifications are not specified in the 3GPP (hereinafter referred to as a Non-3GPP access network).

Further, the 3GPP defines specifications of a PWS (Public Warning System) as an emergency information distribution system that operates in a mobile communication system using the LTE and the EPC.

For example, Non-patent Literature 1 discloses an overview of the PWS. Specifically, in the PWS, a CBC (Cell Broadcast Centre) designates a distribution area of distribution data. For example, the CBC designates a Cell (a cell), a TA (Tracking Area), or an EA (Emergency Area) as a distribution area. The EA is a distribution area that a telecommunications carrier can independently set irrespective of the TA. Further, as described in Section 9.1.3.4.2 of Non-patent Literature 1, an eNB (evolved Node B), which is a base station included in the distribution area, receives a Warning Request message from the CBC through an MME (Mobility Management Entity). After that, the eNB broadcasts distribution data to a plurality of UEs (User Equipment) which are a plurality of communication terminals. In other words, the eNB simultaneously delivers the information to a plurality of UEs by using Cell Broadcast.

CITATION LIST

Non Patent Literature

Non-patent Literature 1: 3GPP TS 23.041 V15.0.0 (2017-12)

SUMMARY OF INVENTION

Technical Problem

Currently, it has been studied how a communication terminal connects to a 5GC through a Non-3GPP access network. However, how to realize a PWS in a mobile communication system including a Non-3GPP access network is not clearly defined. Therefore, there is a problem that a PWS cannot be effectively introduced in a mobile communication system including a Non-3GPP access network.

In view of above-described problem, an object of the present disclosure is to provide a communication apparatus, a distribution apparatus, a communication system, a transmission method, and a program which make it possible to introduce a PWS in a mobile communication system including a Non-3GPP access network.

Solution to Problem

A communication apparatus according to a first aspect of the present disclosure includes: a position information management unit configured to manage a distribution area used in a mobile communication system and position information indicating a position of a communication terminal connected to an access system different from the mobile communication system while associating the distribution area with the position information; a communication terminal management unit configured to manage the communication terminal and a distribution area to which the communication terminal belongs while associating the communication terminal with the distribution area based on positional information indicating a current position of the communication terminal; and a communication unit configured to, when it receives distribution data for which the distribution area is designated as its distribution destination, transmit the distribution data, whose distribution destination has been changed to the communication terminal associated with the distribution area, to the communication terminal.

A distribution apparatus according to a second aspect of the present disclosure includes: a communication apparatus management unit configured to manage a distribution area used in a mobile communication system and a communication apparatus while associating the distribution area with the communication apparatus, the communication apparatus being configured to transmit, to a communication terminal belonging to the distribution area, distribution data addressed to the communication terminal; and a communication unit configured to transmit distribution data for which a distribution area is designated to a communication apparatus managed in association with the distribution area, in which when the communication apparatus management unit receives information about the distribution area managed in association with the communication terminal from the communication apparatus, the communication apparatus management unit adds the communication apparatus as information to be managed in association with the distribution area.

A communication system according to a third aspect of the present disclosure includes: a communication apparatus including: a position information management unit configured to manage a distribution area used in a mobile communication system and position information indicating a position of a communication terminal connected to an access system different from the mobile communication system while associating the distribution area with the position information; a communication terminal management unit configured to manage the communication terminal and a distribution area to which the communication terminal belongs while associating the communication terminal with the distribution area based on positional information indicating a current position of the communication terminal; and a communication unit configured to, when it receives distribution data for which the distribution area is designated as its distribution destination, transmit the distribution data, whose distribution destination has been changed to the communication terminal associated with the distribution area, to the communication terminal; and a distribution apparatus including: a communication apparatus management unit configured to manage the distribution area and a communication apparatus while associating the distribution area with the communication apparatus, the communication apparatus being configured to transmit distribution data to a communication terminal belonging to the distribution area; and a communication unit configured to transmit distribution data for which a distribution area is designated to a communication apparatus managed in association with the distribution area.

A transmission method according to a fourth aspect of the present disclosure includes: managing a distribution area used in a mobile communication system and position information indicating a position of a communication terminal connected to an access system different from the mobile communication system while associating the distribution area with the position information; managing the communication terminal and a distribution area to which the communication terminal belongs while associating the communication terminal with the distribution area based on positional information indicating a current position of the communication terminal; and transmitting, when distribution data for which the distribution area is designated as its distribution destination is received, the distribution data, whose distribution destination has been changed to the communication terminal associated with the distribution area, to the communication terminal.

A program according to a fifth aspect of the present disclosure cause a computer to: manage a distribution area used in a mobile communication system and position information indicating a position of a communication terminal connected to an access system different from the mobile communication system while associating the distribution area with the position information; manage the communication terminal and a distribution area to which the communication terminal belongs while associating the communication terminal with the distribution area based on positional information indicating a current position of the communication terminal; and transmit, when distribution data for which the distribution area is designated as its distribution destination is received, the distribution data, whose distribution destination has been changed to the communication terminal associated with the distribution area, to the communication terminal.

Advantageous Effects of Invention

According to the present disclosure, it is possible to provide a communication apparatus, a distribution apparatus, a communication system, a transmission method, and a program which make it possible to introduce a PWS in a mobile communication system including a Non-3GPP access network.

BRIEF DESCRIPTION OF DRAWINGS

FIG. 3 is a table for explaining data managed by an N3IWF according to the second example embodiment;

FIG. 4 is a table for explaining data managed by the N3IWF according to the second example embodiment;

FIG. 6 is a table for explaining data managed by an AMF according to the second example embodiment;

DESCRIPTION OF EMBODIMENTS

Figure 1:
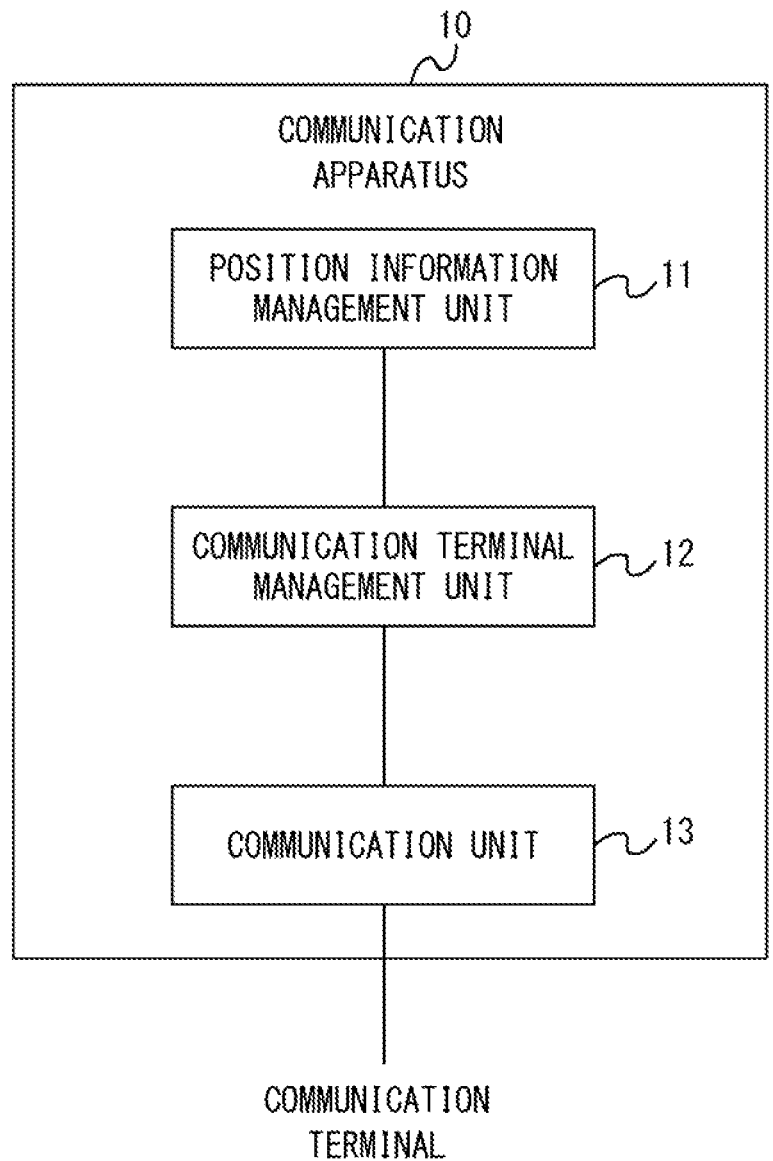
FIG. 1 is a configuration diagram of a communication apparatus according to a first example embodiment.

Example embodiments according to the present disclosure will be described hereinafter with reference to the drawings.

When a PWS is introduced in a mobile communication system including a Non-3GPP access network, it is necessary to clarify a distribution method for communication terminals connected through the Non-3GPP access network.

Specifically, in the PWS, it is assumed that information is simultaneously delivered to a plurality of UEs by using Cell Broadcast. Note that a distribution area designated by a CBC is an area defined in the 3GPP. That is, the PWS can distribute distribution data only to UEs associated with distribution areas defined in the 3GPP. In other words, the PWS can distribute distribution data only to UEs that are connected to a core network through a radio access network by using a communication method defined in the 3GPP such as LTE. Therefore, there is a problem that a communication terminal that is connected to the core network through a Non-3GPP access network cannot receive distribution data by using the PWS. In first to third example embodiments, a process or an operation for solving such a problem will be described.

First Example Embodiment

An example of a configuration of a communication apparatus 10 according to a first example embodiment will be described hereinafter with reference to FIG. 1.

The communication apparatus 10 may be a computer apparatus that operates as a processor executes a program stored in a memory. The communication apparatus 10 may be, for example, a relay apparatus that relays data, a gateway apparatus, or the like.

The communication apparatus 10 includes a position information management unit 11, a communication terminal management unit 12, and a communication unit 13. The position information management unit 11, the communication terminal management unit 12, and the communication unit 13 may be software or modules by which processes are performed as a processor execute a program stored in a memory. Alternatively, the position information management unit 11, the communication terminal management unit 12, and the communication unit 13 may be hardware such as a circuit or a chip.

The position information management unit 11 manages a distribution area used in a mobile communication system and position information indicating the position of a communication terminal connected to an access system different from the mobile communication system while associating the distribution area with the position information. The term "to manage" may be replaced by "to memorize" or "to hold". It may also be replaced in a similar manner in the following description. The mobile communication system may include a radio access network and a core network whose specifications are defined in the 3GPP. Further, the radio access network may use LTE as a communication method. Alternatively, the radio access network may use a communication method that is referred to as 5G in the 3GPP. Further, the core network may use an EPC as a communication method. Alternatively, the core network may use a communication method that is referred to as 5GC in the 3GPP. The access network may be referred to as an AN (Access Network), and the radio access network may be referred to as a RAN (Radio Access Network). A radio access communication method using the LTE may be referred to as E-UTRA (Evolved Universal Terrestrial Radio Access), and a radio access communication method using the 5G may be referred to as NR (New Radio). A RAN that is connected to the 5GC by using the E-UTRA or the NR may be referred to as an NG-RAN (Next Generation Radio Access Network).

The access system different from the mobile communication system may be, for example, a system different from the radio access network included in the mobile communication system. The access system uses, for example, communication standards different from those defined in the 3GPP. The access system may be, for example, a wireless LAN (Local Area Network) system. Alternatively, the access system may use a fixed-line communication network such as a wired LAN.

The communication terminal can connect to an access system different from the mobile communication system. Further, the communication terminal may be able to connect to the mobile communication system. The expression that the communication terminal connects to the mobile communication system or the access system means a state in which the communication terminal can transmit or receive data to or from the mobile communication system or the access system. The communication terminal may be a smartphone terminal, a tablet-type terminal, a mobile phone terminal, or the like. Alternatively, the communication terminal may be an IoT (Internet of Things) terminal (an IoT device) or an MTC (Machine Type Communication) terminal.

The positional information indicating the position of the communication terminal connected to the access system is, for example, positional information different from the positional information based on the Cell defined in the mobile communication system. The position information may be, for example, information that the communication terminal can acquire through a GPS (Global Positioning System). Alternatively, the position information may be information indicating the position of an AP (Access Point) entity to which the communication terminal connects when it performs wireless LAN communication. Alternatively, the position information may be address information or the like that a user operating the communication terminal can enter to the communication terminal as position information.

The distribution area used in the mobile communication system is an area which becomes a distribution destination when data is distributed through the mobile communication system. For example, at least one of a Cell, a TA, and an EA may be designated as the distribution area. Further, the cell, the TA, or the EA to be designated may be a list composed of a plurality of cells, TAs, or EAs.

The position information management unit 11 manages distribution areas used in the mobile communication system and position information indicating the positions of communication terminals connected to the core network through the access system while associating the distribution areas with the position information in advance. That is, the position information management unit 11 may include a database in which distribution areas used in the mobile communication system and position information indicating the positions of communication terminals connected to the core network through the access system are associated with each other in advance.

The communication terminal management unit 12 manages communication terminals and distribution areas to which the communication terminals belong while associating the communication terminals with the distribution areas based on position information indicating the current positions of the communication terminals.

The communication terminal management unit 12 receives, for example, information indicating the current position of the communication terminal as the position information. Further, the communication terminal management unit 12 specifies a distribution area associated with the current position of the communication terminal by using the information managed by the position information management unit 11. The communication terminal management unit 12 manages the specified distribution area and the communication terminal while associating them with each other.

When the communication unit 13 receives distribution data for which the distribution area is designated as its distribution destination, the communication unit 13 transmits the distribution data, whose distribution destination has been changed to the communication terminal associated with the distribution area, to the communication terminal. In other words, the communication unit 13 transmits the distribution data not only to the communication terminal connected from the mobile communication system in its distribution area, but also to the communication terminal connected from the access system associated with its distribution area in the communication terminal management unit 12. Note that the communication unit 13 may also be referred to as a transmitting unit (a Transmitter) and a receiving unit (a Receiver).

The distribution data for which the distribution area is designated is, for example, data that is simultaneously delivered to a plurality of communication terminals located in the distribution area. In other words, the distribution data for which the distribution area is designated is simultaneously delivered by using broadcasting or multicasting. For example, when a Cell is designated as the distribution area, the distribution data is simultaneously delivered to a plurality of communication terminals located in the designated Cell. For example, when a TA is designated as the distribution area, the distribution data is simultaneously delivered to a plurality of communication terminals belonging to the designated TA. For example, when an EA is designated as the distribution area, the distribution data is simultaneously delivered to a plurality of communication terminals located in the designated EA.

The change of the distribution destination to the communication terminal associated with the distribution area by the communication unit 13 may be, for example, a change of the distribution destination to identification information of the communication terminal by the communication unit 13. The identification information may be, for example, address information such as an IP address and a MAC (Media Access Control) address. Alternatively, the identification information may be identification information of a user of the terminal such as an SUPI (Subscription Permanent Identifier), an IMSI (International Mobile Subscriber Identity), an NAI (Network Access Identifier), or an MSISDN (MS international ISDN number). Alternatively, the identification information may be identification information of the terminal apparatus such as a PEI (Permanent Equipment Identifier) or an IMEI (International Mobile Equipment Identity). The distribution data for which a communication terminal is set as the distribution destination is individually distributed (transmitted) by using, for example, unicasting.

As described above, the communication apparatus 10 shown in FIG. 1 includes the position information management unit 11 and the communication terminal management unit 12. Therefore, the communication apparatus 10 can change the destination of distribution data that is simultaneously delivered in the distribution area used in the mobile communication system to a communication terminal connected to an access system different from the mobile communication system. As a result, the communication apparatus 10 can transmit the distribution data that is simultaneously delivered in the distribution area used in the mobile communication system to the communication terminal connected to the access system different from the mobile communication system.

Second Example Embodiment

Next, an example of a configuration of a communication system according to a second example embodiment will be described with reference to FIG. 2. In the communication system shown in FIG. 2, a configuration of a communication system specified in the 3GPP is shown.

Figure 2:
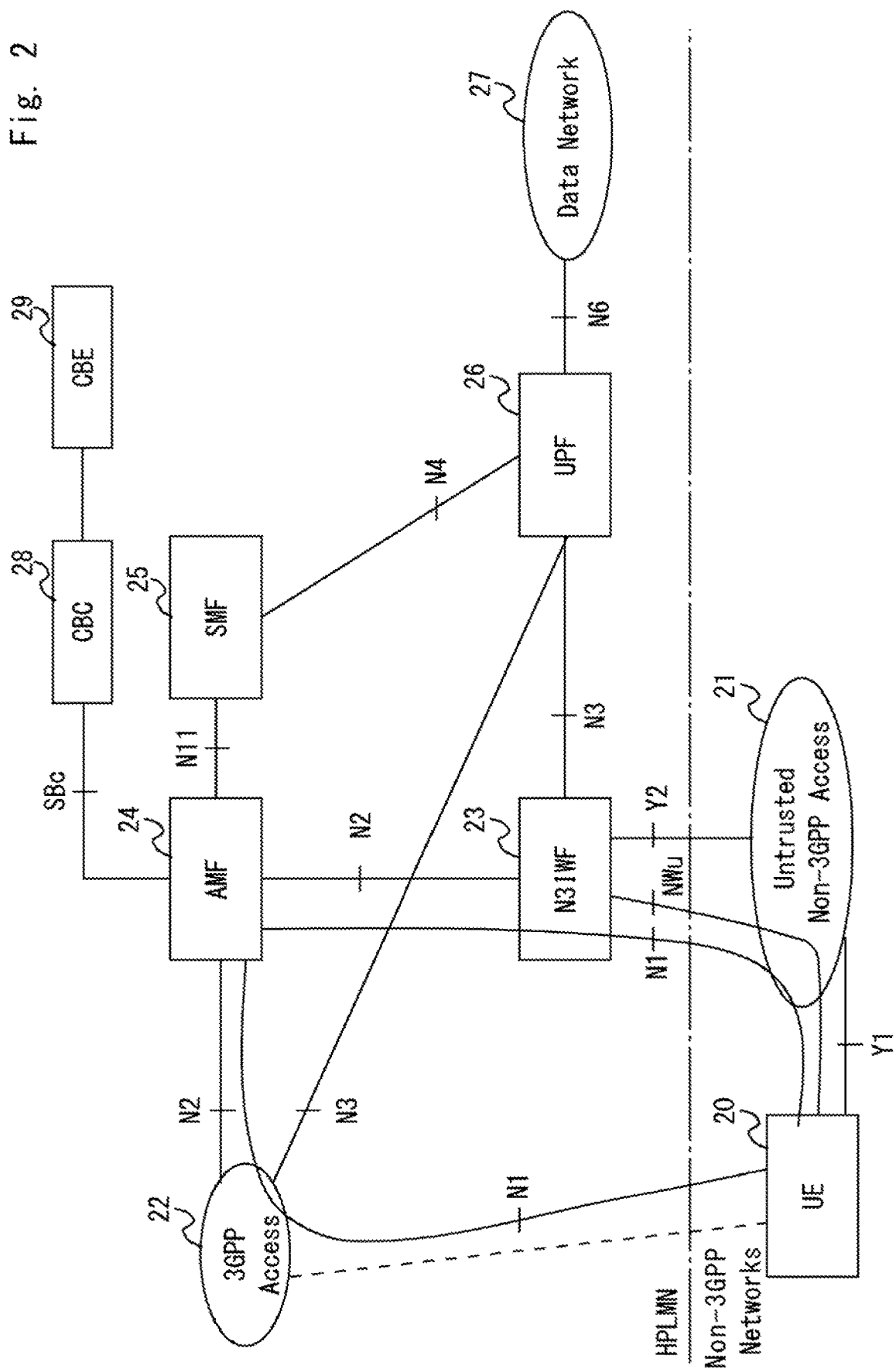
FIG. 2 is a configuration diagram of a communication system according to a second example embodiment.

The communication system shown in FIG. 2 includes a UE (User Equipment) 20 as a communication terminal, and includes an Untrusted Non-3GPP Access network 21 and a 3GPP Access network 22 which use different radio communication methods. Further, the communication system includes an N3IWF (Non 3GPP InterWorking Function) entity 23 (hereinafter referred to a N3IWF 23). Further, the communication system includes, as apparatuses constituting a SGC, an AMF (Access and Mobility Management Function) entity 24, an SMF (Session Management Function) entity 25, and a UPF (User Plane Function) entity 26. Further, the communication system includes a Data Network 27, a CBC (Cell Broadcast Centre) 28, and a CBE (Cell Broadcast Entity) 29. Hereinafter, the Untrusted Non-3GPP Access network 21 is referred to as Untrusted Non-3GPP Access 21. The 3GPP access network 22 is hereinafter referred to as 3GPP Access. The AMF entity 24 is hereinafter referred to as an AMF 24. The SMF entity 25 is hereinafter referred to as an SMF 25. The UPF entity 26 is hereinafter referred to as a UPF 26. Note that the entity may also be referred to as a node apparatus or an apparatus. Note that for core networks using the SGC, adopting a service interface adopting HTTP/2 for communication between an AMF and a CBC has been studied in the 3GPP. When the service interface is used, the CBC may also be referred to as a CBCF (Cell Broadcast Centre Function). The CBCF discloses an Ncbcf service interface to the AMF, while the AMF discloses an Namf service interface to the CBCF. For communication between the CBCF and the AMF, the Ncbcf service interface and the Namf interface are used instead of using the SBc interface shown in FIG. 2.

The UE 20 is used as a general term for communication terminals in the 3GPP. The UE 20 corresponds to the communication terminal according to the first example embodiment. FIG. 2 shows that the UE 20 is connected to the Untrusted Non-3GPP Access 21. Further, in order to indicate that the UE 20 can also connect to the 3GPP access 22, the connection between the UE 20 and the 3GPP access 22 is indicted by a dotted line.

The untrusted Non-3GPP Access 21 uses communication standards different from those defined in the 3GPP. The Untrusted Non-3GPP Access 21 corresponds to the access network in the first example embodiment. The Untrusted Non-3GPP Access 21 may be, for example, a wireless LAN (WLAN) system. Alternatively, the Untrusted Non-3GPP Access 21 may be a fixed-line communication network such as a wired LAN. The Untrusted Non-3GPP Access 21 may include an AP entity used in wireless LAN communication. Further, the Untrusted Non-3GPP Access 21 may be formed by RGs (Residential Gateways), fixed ANs (Access Nodes), and the like specified in the BBF (Broad Band Forum). The fixed ANs may be, for example, ONUs (Optical Network Units).

The untrusted Non-3GPP Access 21 is included in Non-3GPP Networks, which are networks using communication standards different from those defined in the 3GPP.

The 3GPP Access 22 uses communication standards defined in the 3GPP. The 3GPP access 22 may use, for example, LTE. In this case, the 3GPP access 22 may include an eNB which is a base station that performs radio communication with the UE 20. Alternatively, the 3GPP Access 22 may use, for example, communication standards so-called 5G or the like. In this case, the 3GPP access 22 may include a base station that performs radio communication by using the 5G. The base station that performs radio communication by using the 5G may also be referred to as, for example, a gNB (g Node B). Alternatively, a radio access network that connects to a 5GC by using the LTE or the 5G as its communication standards may also be referred to as an NG-RAN (Next Generation Radio Access Network). The 3GPP access 22 corresponds to the radio access network included in the mobile communication system according to the first example embodiment.

Note that in FIG. 2, the 3GPP Access 22, the N3IWF 23, the AMF 24, the SMF 25, the UPF 26, the CBC 28, and the CBE 29 constitute the mobile communication system according to the first example embodiment. The 3GPP Access 22, the N3IWF 23, the AMF 24, the SMF 25, the UPF 26, the CBC 28, and the CBE 29 are node apparatuses or entities disposed in an HPLMN (Home Public Land Mobile Network). Further, the N3IWF 23, the AMF 24, the SMF 25, the UPF 26, the CBC 28, and the CBE 29 are node apparatuses or entities constituting the core network included in the mobile communication system according to the first example embodiment, e.g., node apparatuses or entities constituting the 5GC.

The Data Network 27 may be a network managed by a telecommunications carrier different from the one managing the mobile communication network. The Data Network 27 may be referred to as, for example, an external network. Note that in order to dispose, for example, a call control apparatus necessary for providing a VoLTE (Voice over LTE) voice service in the external network, the telecommunications carrier managing the mobile communication network may possibly manage the external network in itself.

The UPF 26 is disposed between the 3GPP access 22 and the Data Network 27. The UPF 26 performs routing of or forwards user data or U-Plane (User-Plane) data related to the UE 20 between the 3GPP access 22 and the data network 27. Further, the UPF 26 also performs routing of or forwards user data or U-plane data related to the UE 20 between the N3IWF 23 (which will be described later) and the data network 27. Note that hereinafter, the user data or the U-Plane data will be referred to as user data.

The AMF 24 manages, for example, access and/or mobility related to the UE 20. Further, the AMF 24 performs an authentication process for the UE 20 in cooperation with an authentication apparatus (not shown). The SMF 25 performs session management for the UE 20. For example, the SMF 25 manages a session that is established when user data is transmitted between the UE 20 and the Data Network 27. Note that the session management includes establishing, changing, and deleting a session.

The N3IWF 23 communicates with the UE 20 through the Untrusted Non-3GPP Access 21. The N3IWF 23 reciprocally connects different networks to each other, and relays control data or C-Plane (Control-plane) data related to the UE 20 transmitted between the UE 20 and the AMF 24. Further, the N3IWF 23 relays user data related to the UE 20 transmitted between the UE 20 and the UPF 26. Note that the N3IWF 23 may relay a part of user data between the UE 20 and the AMF 24. The N3IWF 23 corresponds to the communication apparatus 10 according to the first example embodiment.

Data transmitted between the N3IWF 23 and the UE 20 is encrypted by using IPsec. That is, the N3IWF 23 and the UE 20 establish IPsec SA (Security Association).

The CBC 28 distributes emergency information generated in the CBE 29 to a distribution area indicated by the CBE 29. The CBC 28 distributes emergency information to, for example, a UE located in the distribution area through the AMF 24 and the 3GPP access 22. In other words, the CBC 28 distributes emergency information through the AMF 24 to the UE 20 connected to the 3GPP access 22. Further, the CBC 28 distributes emergency information through the AMF 24 and the N3IWF 23 to the UE 20 connected to the Untrusted Non-3GPP Access 21. The CBE 29 may be, for example, a server apparatus or the like managed by an administrative agency that keeps watch on earthquakes or tsunamis. Note that the CBC 28 and the CBE 29 may be formed as an integrated apparatus.

FIG. 2 shows reference points defined between node apparatuses. A point N1 is defined between the UE 20 and the AMF 24. Further, a point N1 is also defined between the UE 20 and the AMF 24. A point N2 is defined between the 3GPP Access 22 and the AMF 24. Further, a point N2 is also defined between the N3IWF 23 and the AMF 24. A point N3 is defined between the 3GPP Access 22 and the UPF 26. Further, a point N3 is also defined between the N3IWF 23 and the UPF 26. A point N4 is defined between the SMF 25 and the UPF 26. A point N6 is defined between the UPF 26 and the Data Network 27. A point N11 is defined between the AMF 24 and the SMF 25. A point NWu is defined between the UE 20 and the N3IWF 23. A point Y1 is defined between the UE 20 and the Untrusted Non-3GPP Access 21. A point Y2 is defined between the Untrusted Non-3GPP Access 21 and the N3IWF 23. A point SBc is defined between the AMF 24 and the CBC 28.

Next, data managed by the N3IWF 23 will be described with reference to FIG. 3. The N3IWF 23 corresponds to the communication apparatus 10 according to the first example embodiment. Therefore, the data managed by the N3IWF 23 will be described on the assumption that the N3IWF 23 also includes the position information management unit 11, the communication terminal management unit 12, and the communication unit 13.

FIG. 3 shows data managed by the position information management unit 11. FIG. 3 shows that TAs, EAs, Cells, and locations are managed while they are associated with each other. The TAs, EAs, and Cells indicate distribution areas used in the mobile communication system. That is, the CBC 28 or the CBE 29 designates a TA, an EA, or a Cell as a distribution area. The location is position information indicating the position of the UE 20 connected to the Untrusted Non-3GPP Access 21. The location may be position information that the UE 20 can acquire. Alternatively, the location may be position information of other communication apparatuses or the like located near the current position of the UE 20. For example, the position information may be information indicating the position of an AP (Access Point) entity to which the communication terminal connects when it performs wireless LAN communication. Alternatively, for example, the position information may be information indicating the position of an RG (Residential Gateway) or an ONU (Optical Network Unit) to which the communication terminal connects when it performs communication through a fixed access line. The symbols assigned to the TAs, EAs, Cells, and locations are used to identify the TAs, EAs, Cells, and locations.

FIG. 3 shows that a cell-1 is associated with a location-1 and a location-2. Further, a cell-2 is associated with a location-3, and a cell-4 is associated with a location-4. Further, an EA-1 is associated with the Cell-1, Cell-2, and Cell-3. Further, the EA-1 is associated with the Cell-4, and an EA-2 is associated with a Cell-5 and a Cell-6. Further, a TA-1 is associated with the EA-1, and a TA-2 is associated with the EA-1 and EA-2. The EA-1 is associated with the TA-1 and TA-2. That is, the EA-1 includes the TA-1 and overlaps a part of the TA-2.

Further, the position information management unit 11 may manage, for example, position information of AP entities that the UE 20 connects when it performs wireless LAN communication, and locations while associating them with each other. Specifically, when the AP-1 is located in the location-4, the AP-1 and the location-4 may be managed while being associated with each other as shown in FIG. 3.

For example, an administrator or the like of the N3IWF 23 may enter the information shown in FIG. 3 to the position information management unit 11 in advance. Alternatively, the position information management unit 11 may acquire the information shown in FIG. 3 from other server apparatuses or the like in advance.

Next, data managed by the N3IWF 23 will be described with reference to FIG. 4. FIG. 4 shows data managed by the communication terminal management unit 12. FIG. 4 shows that UEs are further associated with the data managed by the position information management unit 11. That is, FIG. 4 shows that UEs are associated with the information about distribution areas. The symbols assigned to the UEs are used to identify the UEs. The information for identifying a UE may be, for example, a host name, an IP address, or a MAC address of the UE. For example, the information for identifying a UE may be identification information of a user of the terminal such as an SUPI (Subscription Permanent Identifier), an IMSI (International Mobile Subscriber Identity), an NAI (Network Access Identifier), an MSISDN (MS international ISDN number), or the like. Alternatively, the information for identifying a UE may be identification information of a terminal apparatus such as a PEI (Permanent Equipment Identifier), an IMEI (International Mobile Equipment Identity), or the like.

For example, when the UE 20 connects to the Untrusted Non-3GPP Access 21, the UE 20 transmits its position information indicated by the location to the N3IWF 23. Specifically, the UE 20 transmits a connection request message including the position information indicated by the location to the N3IWF 23. The communication terminal management unit 12 manages the location received from the UE 20 through the communication unit 13 while associating it with the UE 20. For example, the communication terminal management unit 12 manages the location-1 and the UE-1 while associating them with each other. Further, the communication terminal management unit 12 associates and manages the location-2 and the UE-2, and associates and manages the location-3 and the UE-3. When the location included in the connection request message is not managed by the position information management unit 11, the communication terminal management unit 12 may reject the connection of the UE 20.

Further, when the UE 20 performs wireless LAN communication, it connects to an AP entity included in the Untrusted Non-3GPP Access 21. In this case, the UE 20 may transmit information for identifying the AP entity to the N3IWF 23. For example, when the UE-4 has connected to the AP-1, it transmits information for identifying the AP-1 to the N3IWF 23. In this case, the position information management unit 11 manages the UE-4 and the location-4 while associating them with each other. Further, similarly to the UE-4, when the UE-5 has connected to the AP-1, it transmits information for identifying the AP-1 to the N3IWF 23. In this case, the position information management unit 11 manages the UE-5 and the location-4 while associating them with each other. That is, the position information management unit 11 may manage a plurality of UEs while associating them with the same location.

Alternatively, when the UE 20 is communicating with the N3IWF 23 through an AP entity, the N3IWF 23 may receive the position information of the AP entity from the AP entity. Alternatively, the N3IWF 23 may manage the position information of the AP entity in advance. That is, the N3IWF 23 does not have to acquire the position information of the AP entity from the UE 20 or from the AP entity.

Figure 5:
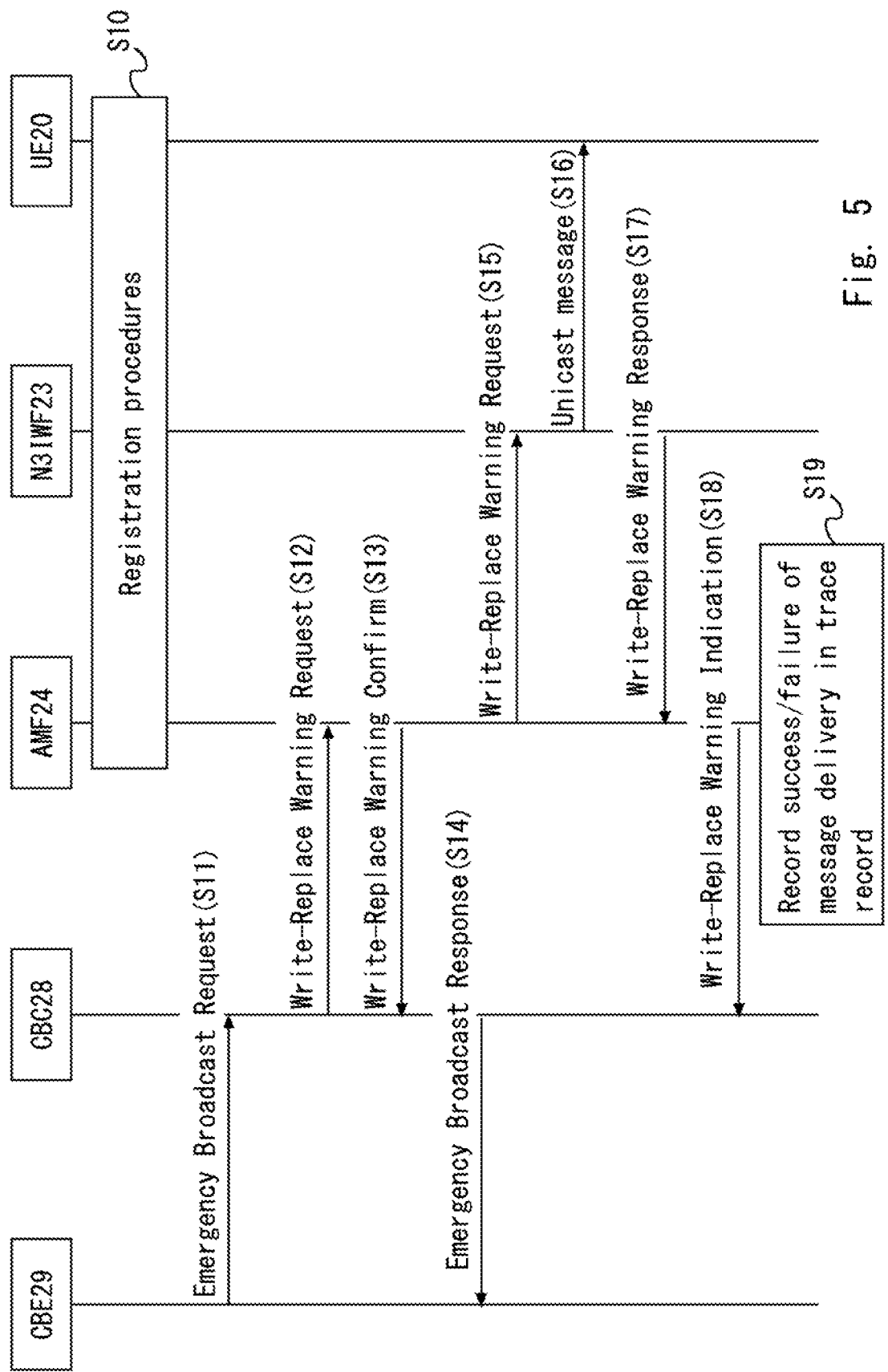
FIG. 5 shows a flow of a data distribution process according to the second example embodiment.

Next, a flow of a data distribution process according to the second example embodiment will be described with reference to FIG. 5. Firstly, the UE 20, the AMF 24, and the N3IWF 23 perform Registration procedures for the UE 20 (S10). In the registration procedures in the step S10, the communication terminal management unit 12 of the N3IWF 23 manages the UE 20 and the distribution area while associating them with each other. Further, in the registration procedures in the step S10, the UE 20 establishes IPsec SA between the UE 20 and the N3IWF 23. Further, in the registration procedures in the step S10, the AMF 24 performs an authentication process as to whether or not to permit the connection of the UE 20.

Next, the CBE 29 transmits, to the CBC 28, an Emergency Broadcast Request message for instructing to distribute emergency information (S11). Next, the CBC 28 transmits, to the AMF 24, a Write-Replace Warning Request message for instructing to distribute emergency information (S12). The Write-Replace Warning Request message includes a TAI (Tracking Area Identity) list. The TAI list includes at least one TA. Further, the Write-Replace Warning Request message includes a Warning Area. The Warning Area corresponds to the distribution area. The Warning Area includes at least one of a Cell ID, a TAI, and an EA ID. The Cell ID is information for identifies a Cell. The TAI is information for identifying a TA. The EA ID is information for identifying an EA.

Next, the AMF 24 transmits a Write-Replace Warning Confirm message to the CBC 28 as a response message to the Write-Replace Warning Request message (S13). Next, the CBC 28 transmits an Emergency Broadcast Response message to the CBE 29 as a response message to the Emergency Broadcast Request message (S14).

Data managed by the AMF 24 will be described hereinafter with reference to FIG. 6. The AMF 24 manages TAI lists, TAs, and N3IWFs while associating them with each other. FIG. 6 shows that a TAI list-1 includes a TA-1 and a TA-2. Further, FIG. 6 shows that a TAI list-2 includes a TA-3, a TA-4, a TA-5, and a TA-6. Further, FIG. 6 also shows that the TAI list-1 is associated with an N3IWF-1, an N3IWF-2, and an N3IWF-3. Further, FIG. 6 shows that the TAI list-2 is associated with an N3IWF-3 and an N3IWF-4.

Referring to FIG. 5 again, the AMF 24 determines an N3IWF which is the transmission destination or the forwarding destination of the Write-Replace Warning Request message. The AMF 24 determines the N3IWF based on the information shown in FIG. 6 and the TAI list included in the Write-Replace Warning Request message received from the CBC 28. Here, it is assumed that the AMF 24 has selected the N3IWF 23 as the transmission destination of the Write-Replace Warning Request message. Further, the AMF 24 may also select a plurality of N3IWFs as the transmission destinations of the Write-Replace Warning Request message.

The AMF 24 forwards the Write-Replace Warning Request message to the N3IWF 23 (S15). The N3IWF 23 specifies a UE associated with the Warning Area included in the Write-Replace Warning Request message. The N3IWF 23 specifies the UE associated with the warning area by using data managed by the communication terminal management unit 12. For example, when the TA-1 is indicated as the warning area, the UE-1, UE-2, and UE-3 are specified. Alternatively, when the cell-1 is indicated as the warning area, the UE-1 and the UE-2 are specified.

The N3IWF 23 transmits the emergency information included in the Write-Replace Warning Request message to the specified UEs 20 (S16). The N3IWF 23 changes the transmission destination of the emergency information included in the Write-Replace Warning Request message from the Warning Area to the UEs 20. IPsec SA has been established between the N3IWF 23 and each of the UEs. Therefore, the N3IWF 23 transmits the emergency information to each of the UEs by using Unicast communication.

When the transmission of the emergency information to each of the UEs by using the Unicast communication is completed, the N3IWF 23 transmits a Write-Replace Warning Response message to the AMF 24 (S17). Next, the AMF 24 transmits a Write-Replace Warning Indication message to the CBC 28 (S18). Further, the AMF 24 determines whether the transmission of the emergency information to each of the UEs has succeeded or failed based on a parameter(s) included in the Write-Replace Warning Response message (S19). Further, the AMF 24 holds the result of the determination (S19).

As described above, the N3IWF 23 can manage a UE 20 connected through the Untrusted Non-3GPP Access 21 and a Warning Area indicating a distribution destination while associating them with each other. In this way, when the N3IWF 23 receives a Write-Replace Warning Request message in which the Warning Area is designated, it can distribute emergency information to the UE 20 associated with the Warning Area. As a result, the N3IWF 23 can distribute distribution data to the UE 20 connected to the core network through the Non-3GPP access network by using the PWS.

Third Example Embodiment

Next, a third example embodiment will be described. In the second example embodiment, an example in which the AMF 24 manages TAI lists, TAs, and N3IWFs while associating them with each other in advance as shown in FIG. 6 is described. However, there are cases in which when a UE 20 requests its registration in the core network, it arbitrarily selects an N3IWF at the connection destination. In such cases, the AMF 24 cannot find beforehand which N3IWF the UE 20 will select. Therefore, the AMF 24 cannot manage the TA indicating the position of the UE 20 and the N3IWF while associating them with each other in advance.

In the third example embodiment, a process for selecting an N3IWF performed by the AMF 24 in a situation where the UE 20 can arbitrarily select an N3IWF at the connection destination will be mainly described.

Further, in the second example embodiment, the position information management unit 11 of the N3IWF 23 manages TAs, EAs and Cells managed by the own apparatus, and locations indicating the positions of UEs while associating them with each other. In contrast, in the third example embodiment, the position information management unit 11 of the N3IWF 23 manages all the TAs defined in the communication system shown in FIG. 2, and locations while associating them with each other.

Figure 7:
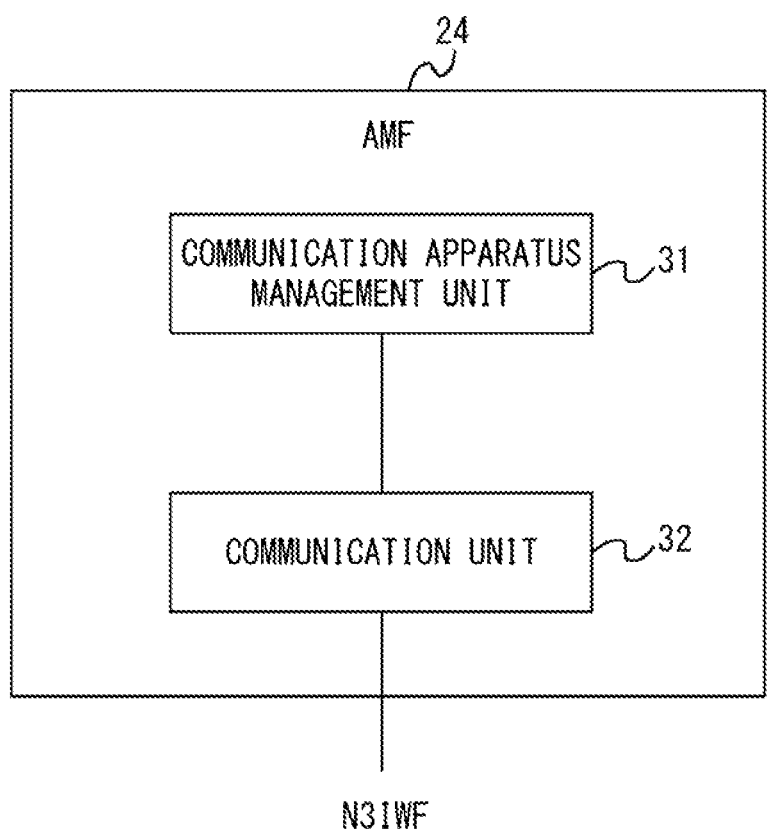
FIG. 7 is a configuration diagram of the AMF according to a third example embodiment.

An example of a configuration of the AMF 24 according to the third example embodiment will be described hereinafter with reference to FIG. 7. The AMF 24 may also be referred to as a distribution apparatus. Further, the AMF 24 may also be referred to as a distribution source that distributes distribution data. The AMF 24 includes a communication apparatus management unit 31 and a communication unit 32. The communication apparatus management unit 31 and the communication unit 32 may be software or modules by which processes are performed as a processor execute a program stored in a memory. Alternatively, the communication apparatus management unit 31 and the communication unit 32 may be hardware such as a circuit or a chip.

The communication unit 32 receives information about the location of the UE 20 managed by the N3IWF 23 from the N3IWF 23. Specifically, when registration procedures or connection procedures are requested from the UE 20, the N3IWF 23 specifies the TA associated with the location of the UE 20. Further, the N3IWF 23 transmits the specified TA to the AMF 24.

The communication apparatus management unit 31 manages the TA received from the N3IWF 23 through the communication unit 32, and the N3IWF 23 while associating them with each other. Further, when the connection between the N3IWF 23 and the UE 20 is disconnected or canceled, the communication apparatus management unit 31 may cancel the association between the TA transmitted from the N3IWF 23 and the N3IWF 23.

Figure 8:
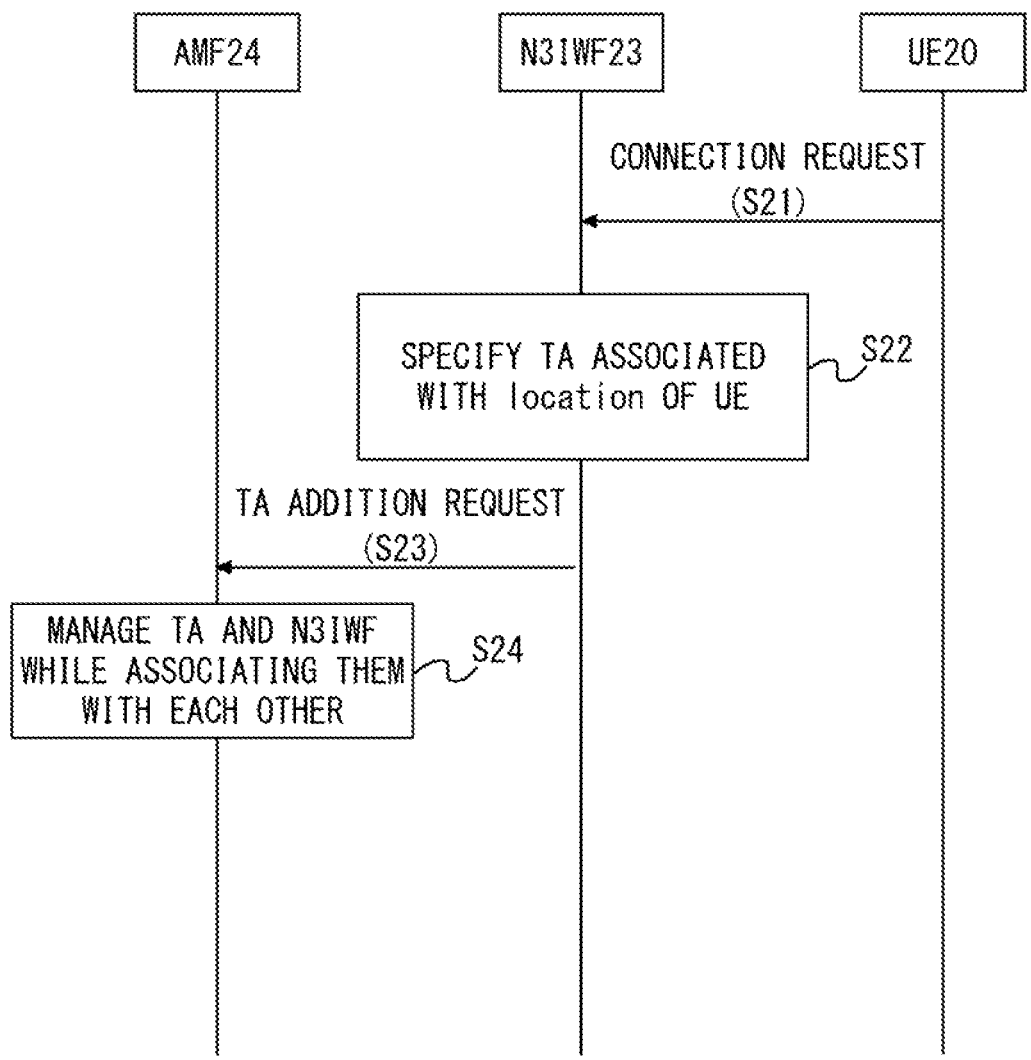
FIG. 8 shows a flow of a UE registration process according to the third example embodiment.

Next, a flow of Registration procedures for a UE will be described with reference to FIG. 8. Firstly, the UE 20 transmits a connection request message to the N3IWF 23 which the UE 20 has selected as the connection destination (S21). The connection request message includes a location indicating the current position of the UE 20.

Next, the N3IWF 23 specifies a location included in the connection request message and a TA associated with this location (S22). Next, the N3IWF 23 transmits a TA addition request message including the specified TA to the AMF 24 (S23).

Next, the AMF 24 manages the TA included in the TA addition request message and the N3IWF 23, which is the transmission source of the TA addition request message, while associating them with each other (S24). Specifically, AMF 24 adds the N3IWF 23 as the N3IWF associated with the TA shown in FIG. 6. The AMF 24 can recognize, by adding the N3IWF 23 in the N3IWF column in FIG. 6, that the N3IWF 23 is connected to the UE located in the TA included in the TA addition request message. Further, in some cases, a plurality of UEs are associated with one TA. In such cases, when the N3IWF 23 detects that a connection with the UE 20 has been established, the N3IWF 23 may check whether or not the TA that has been managed in association with the UE 20 is associated with a UE(s) other than the UE 20. When the TA that has been managed in association with the UE 20 is associated with a UE(s) other than the UE 20, the N3IWF 23 may omit the transmission of the TA addition request message to the AMF 24.

As the AMF 24 manages the TA and the N3IWF while associating them with each other, the following effects can be obtained. When the AMF 24 receives a Write-Replace Warning Request message including a TAI list, it can specify an N3IWF associated with the TAI list and the TA. As a result, the AMF 24 can distribute emergency information to the N3IWF 23 associated with the TA designated in the TAI list included in the Write-Replace Warning Request message.

Figure 9:
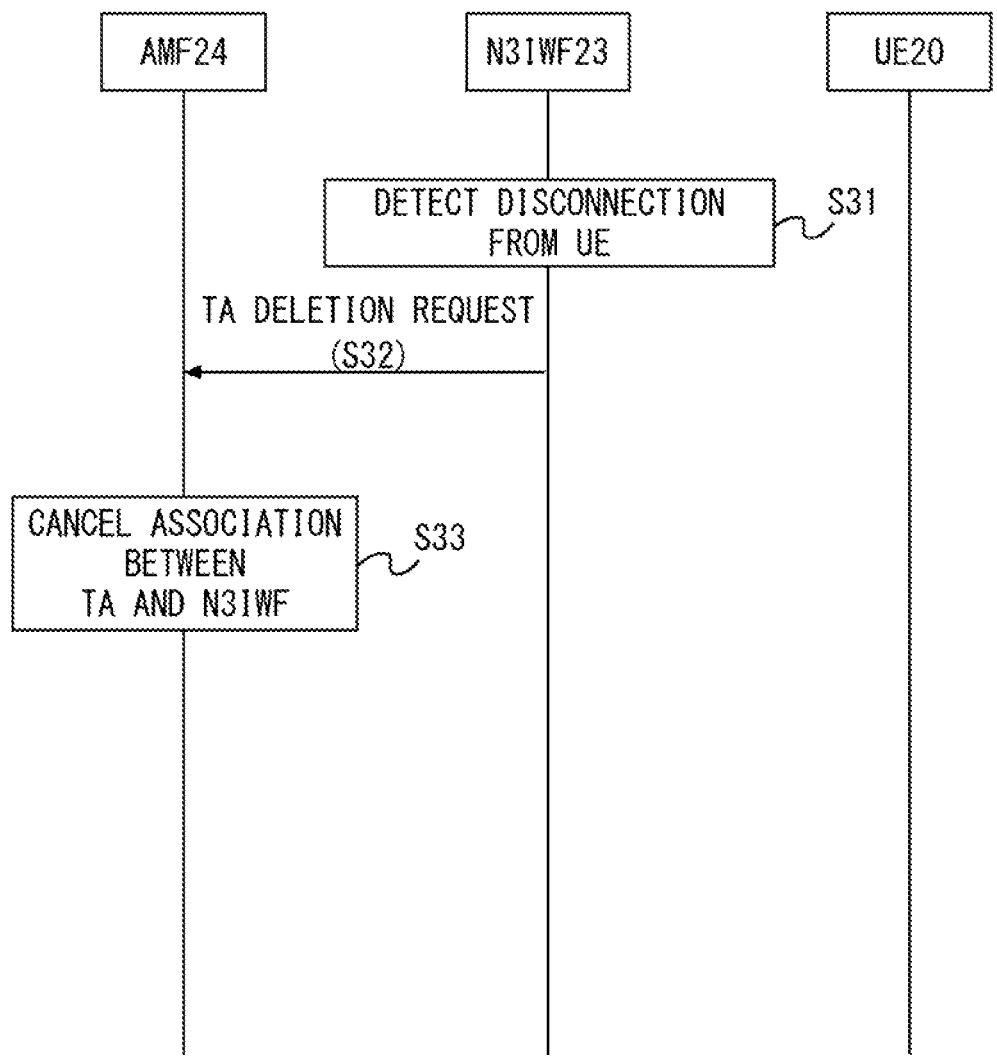
FIG. 9 shows a flow of a process for updating data managed by the AMF according to the third example embodiment.

Next, a flow of processes for updating data managed by the AMF 24 will be described with reference to FIG. 9. FIG. 9 shows processes that are performed when the UE 20 disconnects the connection with the N3IWF 23. For example, the UE 20 disconnects itself from the N3IWF 23 on purpose. Alternatively, when the UE 20 moves to a TA different from the current TA or when the UE 20 disconnects itself from the AP entity to which it is currently connected, the connection between the N3IWF 23 and the UE 20 is disconnected.

Firstly, the N3IWF 23 detects that the connection with the UE 20 has been disconnected (S31). Next, the N3IWF 23 transmits a TA deletion request message including the TA that has been managed in association with the UE 20 to the AMF 24 (S32). When the connection with the UE 20 is disconnected, the UE located in the TA that has been managed in association with the UE 20 does not exist any longer. Therefore, the N3IWF 23 transmits a TA deletion request message to the AMF 24 so that a Write-Replace Warning Request message including the TA, which has been managed as the destination in association with the UE 20, is not transmitted to its own apparatus. Further, in some cases, a plurality of UEs are associated with one TA. In such cases, when the N3IWF 23 detects that the connection with the UE 20 has been disconnected, the N3IWF 23 may check whether or not the TA that has been managed in association with the UE 20 is associated with a UE(s) other than the UE 20. When the TA that has been managed in association with the UE 20 is not associated with any UE other than the UE 20, the N3IWF 23 may send the TA deletion request message to the AMF 24.

Next, when the AMF 24 receives the TA deletion request message, it cancels the association between the TA included in the TA deletion request message and the N3IWF 23 (S33). By cancelling the association between the TA included in the TA delete request message and the N3IWF 23, the AMF 24 can prevent itself from transmitting a message that includes the TA included in the TA delete request message as a destination thereof to the N3IWF 23.

As described above, the AMF 24 according to the third example embodiment can dynamically manage the association between the N3IWF 23 and the TA. In the case where the AMF 24 cannot dynamically manage the association between the N3IWF 23 and the TA, the AMF 24 cannot recognize which N3IWF 23 is associated with which TA. In this case, the AMF 24 needs to transmit the Write-Replace Warning Request message to all the N3IWFs 23.

In contrast, the AMF 24 according to the third example embodiment can specify the N3IWF 23 associated with the TA included in the Write-Replace Warning Request message. Therefore, the AMF 24 can transmit the Write-Replace Warning Request message only to the N3IWF 23 which requires the distribution of emergency information. That is, the AMF 24 does not need to transmit the message to all the N3IWFs 23. As a result, in the third example embodiment, the number of messages transmitted in the communication system can be reduced as compared with the case where the AMF 24 transmits the Write-Replace Warning Request message to all the N3IWFs 23. Further, it is possible to prevent the N3IWF 23 which does not require the distribution of emergency information from receiving the unnecessary Write-Replace Warning Request message.

Fourth Example Embodiment

Next, details of a fourth example embodiment will be described. As described above with reference to FIG. 5, when the AMF 24 distributes emergency information, it receives the Write-Replace Warning Request message from the CBC 28. Note that the Write-Replace Warning Request message may include no TAI list. In such a case, the AMF 24 cannot specify the 3GPP Access 22, the N3IWF 23, and the like that are included in TAs in the TAI list or associated with TAs in the TAI list. Therefore, the AMF 24 transmits the Write-Replace Warning Request message to all the node apparatuses, entities, and the like connected through a reference point or an interface in which N2 is defined.

Note that as shown in FIG. 2, N2 is defined as a reference point between the 3GPP Access 22 and the AMF 24, and between the N3IWF 23 and the AMF 24. Therefore, when the AMF 24 receives a Write-Replace Warning Request message including no TAI list, the AMF transmits this message to the N3IWF 23 as well as to the 3GPP Access 22.

However, the N3IWF 23, which has received the Write-Replace Warning Request message, cannot simultaneously deliver the information to a plurality of UEs by using Cell Broadcast. Therefore, the N3IWF 23 discards the received Write-Replace Warning Request message.

Therefore, when the AMF 24 receives a Write-Replace Warning Request message including no TAI list, the following problems occur. Firstly, there is a problem that the N3IWF 23 needs to discard the received Write-Replace Warning Request message, thus causing a wasteful process. Secondly, there is another problem that the AMF 24 needs to transmit the Write-Replace Warning Request message, which will eventually be discarded, to the N3IWF 23, thus causing a wasteful process. Further, there is also another problem that transmission resources are wastefully used for unnecessary communication. In the fourth example embodiment, a process or an operation for solving at least one of the above-described three problems will be described.

Figure 10:
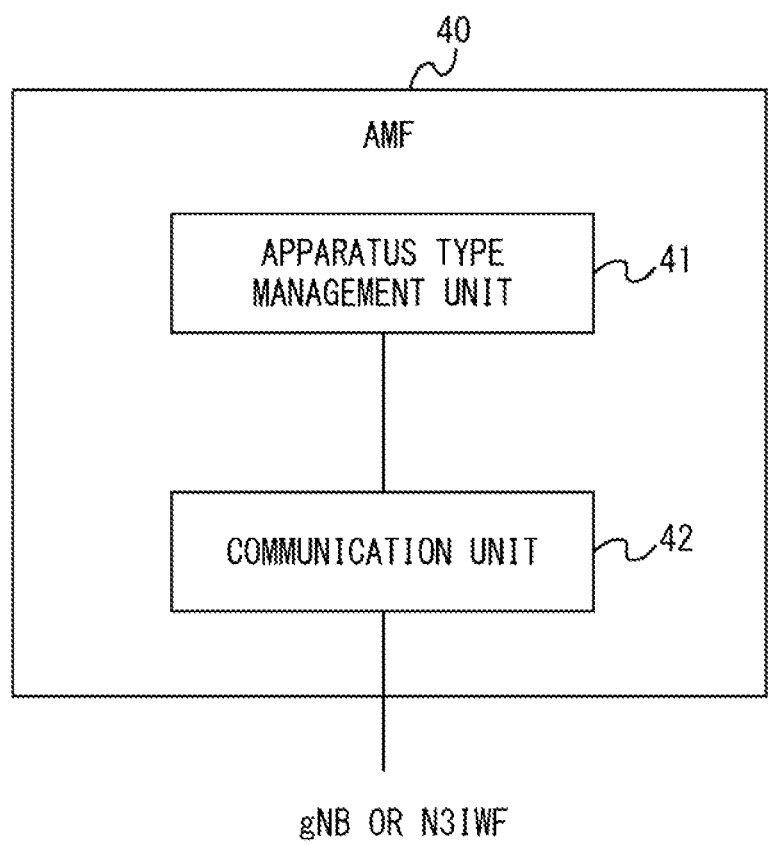
FIG. 10 is a configuration diagram of an AMF according to a fourth example embodiment.

Firstly, an example of a configuration of an AMF 40 according to the fourth example embodiment will be described with reference to FIG. 10. The AMF 40 includes an apparatus type management unit 41 and a communication unit 42. The apparatus type management unit 41 and the communication unit 42 may be software or modules by which processes are performed as a processor execute a program stored in a memory. Alternatively, the apparatus type management unit 41 and the communication unit 42 may be hardware such as a circuit or a chip.

The apparatus type management unit 41 manages host names of node apparatuses or entities connected through a reference point in which N2 is defined and their apparatus types while associating them with each other. The apparatus type may be information for specifying whether the node apparatus is a node apparatus in a 3GPP access network or a node apparatus in a Non-3GPP access network. For example, the apparatus type may be information indicating whether the node apparatus is a gNB or an N3IWF. Note that instead of using the apparatus type, information indicating an access communication method supported by the apparatus may be used.

The UE 20 communicates with the AMF 40 through a gNB (3GPP Access) or an N3IWF 23 (Non-3GPP Access), and performs Registration procedures. In the registration procedures for the UE 20, the AMF 40 establishes a connection with the gNB (3GPP Access) or the N3IWF 23 through a reference point in which N2 is defined (hereinafter referred to as an N2 connection). The AMF 40 acquires an apparatus type of the apparatus or the entity, which is connected through the reference point in which N2 is defined, before, during, or after the establishment of the N2 connection. The apparatus type management unit 41 manages the acquired apparatus type and the host name of the apparatus or the entity, which is the connection destination of the N2 connection, while associating them with each other.

Alternatively, the AMF 40 may store information in which the host name is associated with the apparatus type in advance. For example, an administrator or the like who administers the AMF 40 may enter information in which the host name is associated with the apparatus type to the AMF 40. Alternatively, the AMF 40 may acquire information in which the host name is associated with the apparatus type from a management apparatus, a server apparatus, or the like that manages the information in which the host name is associated with the apparatus type.

When the communication unit 42 receives a Write-Replace Warning Request message including no TAI list, the communication unit 42 transmits this message to an apparatus having a host name that is associated with an apparatus type "gNB". In other words, the communication unit 42 does not transmit the Write-Replace Warning Request message to any apparatus having a host name that is associated with an apparatus type "N3IWF". In yet other words, when the communication unit 42 receives a Write-Replace Warning Request message including no TAI list, the communication unit 42 excludes an apparatus(es) having a host name(s) that is associated with the apparatus type "N3IWF" from the transmission destinations of this message.

As described above, when the AMF 40 according to the fourth example embodiment receives a Write-Replace Warning Request message including no TAI list, the AMF can prevent itself from transmitting an unnecessary message to the N3IWF 23. That is, the AMF 40 can prevent itself from transmitting the Write-Replace Warning Request message that will be discarded in the N3IWF 23 to the N3IWF 23. As a result, loads related to the process for transmitting the Write-Replace Warning Request message performed in the AMF 40 are reduced. Further, loads related to the process for receiving the Write-Replace Warning Request message and the process for discarding it performed in the N3IWF 23 are reduced. Further, it is possible to eliminate exchanges of unnecessary messages and to prevent transmission resources from being wastefully used.

Figure 11:
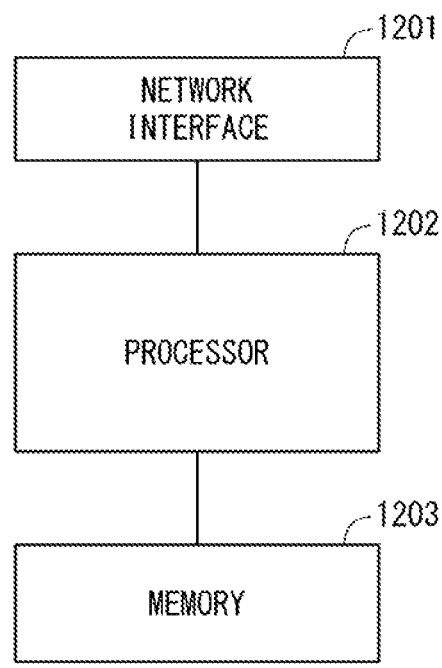
FIG. 11 is a configuration diagram of a communication apparatus and an AMF according to each example embodiment.

FIG. 11 is a block diagram showing an example of the configuration of each of the communication apparatus 10, the AMF 24, and the AMF 40 (hereinafter referred to as the communication apparatus 10 and the like) described in the above-described example embodiments. Referring to FIG. 11, each of the communication apparatus 10 and the like includes a network interface 1201, a processor 1202, and a memory 1203. The network interface 1201 is used for communication with other network node apparatuses constituting the communication system. The network interface 1201 may include, for example, a network interface card (NIC) in conformity with IEEE 802.3 series.

The processor 1202 may load software (a computer program) from the memory 1203 and execute the loaded software, thereby performing the processes of the communication apparatus 10 or the like described by using the sequence diagram and the flowchart in the above-described embodiments. The processor 1202 may be, for example, a microprocessor, an MPU (Micro Processing Unit), or a CPU (Central Processing Unit). The processor 1202 may include a plurality of processors.

The memory 1203 is formed by a combination of a volatile memory and a nonvolatile memory. The memory 1203 may include a storage located remotely from the processor 1202. In this case, the processor 1202 may access the memory 1203 through an I/O interface (not shown).

In the example shown in FIG. 11, the memory 1203 is used to store a group of software modules. The processor 1202 may load the group of software modules from the memory 1203 and execute the loaded software module, thereby performing the processes of the communication apparatus 10 or the like described in the above-described embodiments.

As described above with reference to FIG. 11, each of the processors included in the communication apparatus 10 or the like executes one or a plurality of programs including a group of instructions for causing a computer to perform the algorithm described above with reference to the drawings.

In the above-described examples, the program may be stored in various types of non-transitory computer readable media and thereby supplied to the computer. The non-transitory computer readable media includes various types of tangible storage media. Examples of the non-transitory computer readable media include a magnetic recording medium (such as a flexible disk, a magnetic tape, and a hard disk drive) and a magneto-optic recording medium (such as a magneto-optic disk). Further, examples of the non-transitory computer readable media include CD-ROM (Read Only Memory), CD-R, and CD-R/W. Further, examples of the non-transitory computer readable media include a semiconductor memory. The semiconductor memory includes, for example, a mask ROM, a PROM (Programmable ROM), an EPROM (Erasable PROM), a flash ROM, and a RAM (Random Access Memory). These programs may be supplied to the computer by using various types of transitory computer readable media. Examples of the transitory computer readable media include an electrical signal, an optical signal, and an electromagnetic wave. The transitory computer readable media can be used to supply programs to the computer through a wired communication line (e.g., electric wires and optical fibers) or a wireless communication line.

Note that the present disclosure is not limited to the use in which distribution data of a PWS is distributed. For example, a distribution area of a mobile communication system is a set of pieces of position information of the mobile communication system. Therefore, when the granularity of a distribution area is subdivided to granularity equal or close to that of the positional information of the mobile communication system, the features of the present disclosure can also be expressed as follows. For example, the features of the present disclosure may also be expressed that it has a feature that position information of a communication terminal connected to an access system different from the mobile communication system is associated with the position information of the mobile communication system. Therefore, the present disclosure is not limited to the use in which distribution data of a PWS is distributed. For example, it can be applied to use in which a telecommunications carrier acquires position information of a terminal connected to an access system different from the mobile communication system as position information of the mobile communication system.

Further, the use of the present disclosure is not limited to the distributions to distribution areas used in the mobile communication system. For example, assuming that a distribution area is set not only in the mobile communication system but also in an access system different from the mobile communication system in the future, it is conceivable to define Cells, TAs, or EAs unique to the access system. For example, the cells, TAs, or EAs unique to the access system are cells, TAs, or EAs having values that do not overlap with cells, TAs, or EAs of the mobile communication system. In that case, it can also be expressed that the present disclosure has a feature that position information of a communication terminal connected to an access system different from the mobile communication system is associated with a distribution area unique to the access system. Therefore, the present disclosure is not limited to the distributions to distribution areas used in the mobile communication system, and can be applied to, for example, distributions to distribution areas used in the access system.

Further, the present disclosure is not limited to the above-described embodiments and can be modified as appropriate without departing from the scope and spirit of the disclosure. Further, the present disclosure may be implemented by combining those example embodiments as appropriate.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

This application is based upon and claims the benefit of priority from Japanese patent applications No. 2018-025795, filed on Feb. 16, 2018, the disclosure of which is incorporated herein in its entirety by reference.

Further, the whole or part of the embodiments disclosed above can be described as, but not limited to, the following supplementary notes.

(Supplementary Note 1)

A communication apparatus comprising:

a position information management unit configured to manage a distribution area used in a mobile communication system and position information indicating a position of a communication terminal connected to an access system different from the mobile communication system while associating the distribution area with the position information;

a communication terminal management unit configured to manage the communication terminal and a distribution area to which the communication terminal belongs while associating the communication terminal with the distribution area based on positional information indicating a current position of the communication terminal; and a communication unit configured to, when it receives distribution data for which the distribution area is designated as its distribution destination, transmit the distribution data, whose distribution destination has been changed to the communication terminal associated with the distribution area, to the communication terminal.

(Supplementary Note 2)

The communication apparatus described in Supplementary note 1, wherein the communication terminal management unit receives a message requesting a connection from the communication terminal through the access system, and manages the communication terminal and a distribution area to which the communication terminal belongs while associating the communication terminal with the distribution area based on position information included in the message.

(Supplementary Note 3)

The communication apparatus described in Supplementary notes 1 or 2, wherein the communication unit transmits distribution data to a communication terminal connected to the access system by using unicast communication, the distribution data being data that is simultaneously transmitted to a plurality of communication terminals by using broadcast communication in which the distribution area is designated in the mobile communication system.

(Supplementary Note 4)

The communication apparatus described in any one of Supplementary notes 1 to 3, wherein the position information indicates a position of the communication terminal or a position of a relay apparatus to which the communication terminal is connected.

(Supplementary Note 5)

The communication apparatus described in any one of Supplementary notes 1 to 4, wherein the distribution area is an area in which at least one of a cell, a TA (Tracking Area), and an EA (Emergency Area) defined in the mobile communication system is designated.

(Supplementary Note 6)

The communication apparatus described in Supplementary note 2, wherein when the position information included in the message is not managed by the position information management unit, the communication terminal management unit rejects a connection of the communication terminal that has transmitted the message.

(Supplementary Note 7)

The communication apparatus described in any one of Supplementary notes 1 to 6, wherein the communication unit transmits information about the distribution area managed by the communication terminal management unit in association with the communication terminal to a distribution apparatus that has distributed the distribution data.

(Supplementary Note 8)

The communication apparatus described in Supplementary note 7, wherein the communication unit transmits, to the distribution apparatus, information about a distribution area that is newly managed in association with the communication terminal in the communication terminal management unit.

(Supplementary Note 9)

The communication apparatus described in Supplementary note 7 or 8, wherein the communication unit transmits, to the distribution apparatus, information about a distribution area deleted from the communication terminal management unit.

(Supplementary Note 10)

A distribution apparatus comprising:

a communication apparatus management unit configured to manage a distribution area used in a mobile communication system and a communication apparatus while associating the distribution area with the communication apparatus, the communication apparatus being configured to transmit, to a communication terminal belonging to the distribution area, distribution data addressed to the communication terminal; and a communication unit configured to transmit distribution data for which a distribution area is designated to a communication apparatus managed in association with the distribution area, wherein when the communication apparatus management unit receives information about the distribution area managed in association with the communication terminal from the communication apparatus, the communication apparatus management unit adds the communication apparatus as information to be managed in association with the distribution area.

(Supplementary Note 11)

The distribution apparatus described in Supplementary note 10, wherein when the communication apparatus management unit receives, from the communication apparatus, information indicating that the distribution area managed in association with the communication terminal has been deleted, the communication apparatus management unit deletes the communication apparatus from the information managed in association with the distribution area.

(Supplementary note 12)

A communication system comprising:

a communication apparatus comprising:

a position information management unit configured to manage a distribution area used in a mobile communication system and position information indicating a position of a communication terminal connected to an access system different from the mobile communication system while associating the distribution area with the position information;

a communication terminal management unit configured to manage the communication terminal and a distribution area to which the communication terminal belongs while associating the communication terminal with the distribution area based on positional information indicating a current position of the communication terminal; and a communication unit configured to, when it receives distribution data for which the distribution area is designated as its distribution destination, transmit the distribution data, whose distribution destination has been changed to the communication terminal associated with the distribution area, to the communication terminal; and a distribution apparatus comprising:

a communication apparatus management unit configured to manage the distribution area and a communication apparatus while associating the distribution area with the communication apparatus, the communication apparatus being configured to transmit distribution data to a communication terminal belonging to the distribution area; and a communication unit configured to transmit distribution data for which a distribution area is designated to a communication apparatus managed in association with the distribution area.

(Supplementary Note 13)

The communication system described in Supplementary note 12, wherein when the distribution apparatus receives, from the communication apparatus, information indicating that the distribution area managed in association with the communication terminal has been deleted, the distribution apparatus deletes the communication apparatus from the information managed in association with the distribution area.

(Supplementary Note 14)

A transmission method comprising:

managing a distribution area used in a mobile communication system and position information indicating a position of a communication terminal connected to an access system different from the mobile communication system while associating the distribution area with the position information;

managing the communication terminal and a distribution area to which the communication terminal belongs while associating the communication terminal with the distribution area based on positional information indicating a current position of the communication terminal; and transmitting, when distribution data for which the distribution area is designated as its distribution destination is received, the distribution data, whose distribution destination has been changed to the communication terminal associated with the distribution area, to the communication terminal.

(Supplementary Note 15)

A program for causing a computer to:

manage a distribution area used in a mobile communication system and position information indicating a position of a communication terminal connected to an access system different from the mobile communication system while associating the distribution area with the position information;

manage the communication terminal and a distribution area to which the communication terminal belongs while associating the communication terminal with the distribution area based on positional information indicating a current position of the communication terminal; and transmit, when distribution data for which the distribution area is designated as its distribution destination is received, the distribution data, whose distribution destination has been changed to the communication terminal associated with the distribution area, to the communication terminal.

REFERENCE SIGNS LIST

10 COMMUNICATION APPARATUS
11 POSITION INFORMATION MANAGEMENT UNIT
12 COMMUNICATION TERMINAL MANAGEMENT UNIT
13 COMMUNICATION UNIT
20 UE
21 Untrusted Non-3GPP Access
22 3GPP Access
23 N3IWF
24 AMF
25 SMF
26 UPF
27 Data Network
28 CBC
29 CBE
31 COMMUNICATION APPARATUS MANAGEMENT UNIT
32 COMMUNICATION UNIT
40 AMF
41 APPARATUS TYPE MANAGEMENT UNIT
42 COMMUNICATION UNIT

What is claimed is:

1. A method for an AMF (Access and Mobility Management Function) apparatus, the method comprising:
connecting to a 3GPP (3rd Generation Partnership Project) access network and an N3IWF (Non-3GPP InterWorking Function) node apparatus;
receiving a Write-Replace Warning Request message from a CBC (Cell Broadcast Centre); and
in a case where the Write-Replace Warning Request message does not include a list of TAIs (Tracking Area Identities), forwarding the Write-Replace Warning Request message to an NG-RAN (Next Generation Radio Access Network) node apparatus indicated by information identifying a node apparatus of the 3GPP access network without forwarding the Write-Replace Warning Request message to the N3IWF node apparatus.

2. A communication system comprising:
an AMF (Access and Mobility Management Function) apparatus configured to manage access and mobility related to a UE (User Equipment); and
a CBC (Cell Broadcast Centre) configured to distribute emergency information, wherein the CBC sends a Write-Replace Warning Request message to the AMF apparatus, and
wherein the AMF connects to a 3GPP (3rd Generation Partnership Project) access network and an N3IWF (Non-3GPP InterWorking Function) node apparatus, and
wherein in a case where the Write-Replace Warning Request message does not include a list of TAIs (Tracking Area Identities), the AMF apparatus forwards the Write-Replace Warning Request message to an NG-RAN (Next Generation Radio Access Network) node apparatus indicated by information identifying a node apparatus of the 3GPP access network without forwarding the Write-Replace Warning Request message to the N3IWF node apparatus.

* * * * *